UNITED STATES PATENT OFFICE.

ROBERT GANS, OF PANKOW, NEAR BERLIN, GERMANY, ASSIGNOR TO J. D. RIEDEL AKTIENGESELLSCHAFT, OF BERLIN, GERMANY, A CORPORATION OF GERMANY.

ALUMINO-SILICATE OR ARTIFICIAL ZEOLITE.

943,535.  Specification of Letters Patent.  Patented Dec. 14, 1909.

No Drawing.  Application filed February 18, 1907.  Serial No. 357,997.

REISSUED

*To all whom it may concern:*

Be it known that I, ROBERT GANS, a subject of the German Emperor, residing at Pankow, near Berlin, Germany, have invented certain new and useful Improvements Relating to Alumino-Silicates or Artificial Zeolites, of which the following is a specification.

Compounds resembling zeolites have been produced by fusing together an alkali or alkali-carbonate and aluminium-silicate. The compounds are of an amorphous pasty nature and form with water gelatinous liquids, while yielding alkali-silicate and alkali-alumino-silicate. Owing to these two properties they are unsuitable for industrial purposes, especially also as they are almost impermeable.

Hydrated alumino-silicates which contain 2, 3, 4, 6 or more molecules of silicic acid to 1 molecule of alumina and 1 molecule of soda (sodium oxid) and are free from the said faults, are obtained by adding to the melts of alumina-silicates with alkali or alkali-carbonate quartz in sufficient quantity to insure, that the whole of the alkali metal will combine with the silicic acid and the alumina. In producing melts with alkali-carbonate this may be recognized by the fact that the molten and cooled mass, when brought in contact with acids, will not yield carbonic acid at all or only in small quantities.

Another criterion showing that the operation has been performed correctly, is that on treating the molten product with water, the zeolites remain behind, not in a pasty or semi-liquid condition, but as a crystalline compact mass.

Instead of pure aluminium-silicates, minerals containing alumina in the shape of silicates or aluminates or alumina may be fused together with the alkali or alkali-carbonates and quartz or minerals rich in quartz. As a matter of course, alkali-silicate may be used instead of alkali or alkali-carbonate for producing the melt. The zeolites thus obtained have sometimes a crystalline, sometimes a granular and sometimes a laminated structure and are therefore highly permeable, that is to say, liquids filter easily even through a thick layer of these zeolites, they have no tendency to form gelatinous or colloid solutions and are therefore very useful for industrial purposes. They exchange their bases very easily and may be converted into other zeolites by washing with saline solutions. If the percentage of alkali or alkali-carbonate in the melt is very much reduced, for instance so that for $2Al_2O_3.9SiO_2$ there are only $2Na_2CO_3$, nephelin or eolite is produced. These silicates are anhydrous, consequently they are unable to exchange their bases and unsuitable for industrial applications.

Among the great number of modifications of the mixture possible for preparing the melt, I will describe two examples. The number is so great, because by varying the quantity of quartz the contents of alkali may also be varied.

1. The following materials may be mixed together and then fused.

Kaolin _____ 3 parts by weight
Quartz _____ 6   "   "   "
Sodium carbonate ___12   "   "   "

The molecular composition of this melt is as follows:—

$$1Al_2O_3 + 10SiO_2 + 10Na_2O$$

The melt is subjected to extraction with water, thereby obtaining a crystalline alumino-silicate, which has the following composition:

$SiO_2$ = 46.0 per cent.
$Al_2O_3$ = 22   "   "
$Na_2O$ = 13.6   "   "
$H_2O$ = 18.4   "   "

The extraction of the melt with water has the effect of removing chiefly alkali-silicates, such as correspond to the formulas:

$$Na_2SiO_3(K_2SiO_3) \text{ to } Na_4SiO_4(K_4SiO_4)$$

2. Or the following materials may be melted after mixing together:

Alumina _____ 2 parts by weight
Quartz _____12   "   "   "
Sodium carbonate ___20   "   "   "

This melt has the same molecular composition and, on being extracted with water, it yields a product equal to that obtained from the melt according to the first example.

The products obtained by the present process are suitable chiefly for the purification or softening of water, also for the treatment of saccharine juices and molasses, to relieve them of the potash and soda which cause the formation of molasses, in order that larger quantities of sugar may crystallize out of the liquid.

The purification or the softening of water may be effected in a simple manner by filtering the water through a layer of aluminosilicate containing sodium.

The chemical reaction may take place, for example, in the manner indicated by the following equation:

$$2SiO_2.Al_2O_3Na_2O + CaH_2(CO_3)_2 = 2SiO_2.Al_2O_3.CaO + 2NaHCO_3.$$

Molasses and saccharine juices containing potash are filtered through alumino-silicates containing calcium, in which case the chemical reaction taking place may be expressed, for example, by the following equation:

$$2SiO_2.Al_2O_3.CaO + K_2O = 2SiO_2.Al_2O_3K_2O + CaO.$$

What I claim is:—

1. The herein described process for the manufacture of zeolites in a crystalline form, which consists in melting together an alumina-compound and an alkali-carbonate with the addition of as much quartz as may be necessary to insure that the whole of the alkali will combine with the silicic acid and the alumina, and subsequently extracting the melt with water.

2. The herein described process for the manufacture of zeolites in a crystalline form, which consists in fusing together alumina-silicate and an alkali-carbonate, with the addition of the quantity of quartz necessary for converting the whole of the alkali into compounds of silica and alumina, and subsequently extracting the melt with water.

In testimony whereof I have set my hand hereunto in the presence of two subscribing witnesses.

ROBERT GANS.

Witnesses:
PAUL SIEDLER,
RUD. AGUST FELDHOFF.